United States Patent
Mukumoto et al.

(10) Patent No.: US 11,919,382 B2
(45) Date of Patent: Mar. 5, 2024

(54) ELECTRICALLY DRIVEN VEHICLE

(71) Applicant: HONDA MOTOR CO., LTD., Tokyo (JP)

(72) Inventors: Yasunori Mukumoto, Tokyo (JP); Tetsuya Sugizaki, Tokyo (JP); Hirotaka Hayakawa, Tokyo (JP); Daichi Yamanaka, Tokyo (JP); Ryoji Ando, Tokyo (JP); Shinya Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 17/671,629

(22) Filed: Feb. 15, 2022

(65) Prior Publication Data

US 2022/0314775 A1   Oct. 6, 2022

(30) Foreign Application Priority Data

Mar. 30, 2021   (JP) .................................. 2021-058204

(51) Int. Cl.
*B60K 1/04*   (2019.01)
*B60K 13/04*   (2006.01)
(Continued)

(52) U.S. Cl.
CPC ................ *B60K 1/04* (2013.01); *B60K 13/04* (2013.01); *B60R 13/0869* (2013.01); *B62D 25/20* (2013.01)

(58) Field of Classification Search
CPC .. B60K 1/04; B60K 13/04; B60K 2001/0416; B60K 2001/0433; B60K 2001/0438;
(Continued)

(56) References Cited

U.S. PATENT DOCUMENTS

| 2011/0068622 A1* | 3/2011 | Ikeno | B60K 1/00 307/10.1 |
| 2014/0170342 A1* | 6/2014 | Peitz | B62D 29/005 428/209 |

(Continued)

FOREIGN PATENT DOCUMENTS

| CN | 103171447 A | * | 6/2013 | ............... B60K 1/04 |
| JP | 2005-125841 | | 5/2005 | |

(Continued)

OTHER PUBLICATIONS

Japanese Office Action for Japanese Patent Application No. 2021-058204 dated Dec. 13, 2022.

*Primary Examiner* — Grant Moubry
*Assistant Examiner* — James G Moubry
(74) *Attorney, Agent, or Firm* — Amin, Turocy & Watson, LLP

(57) ABSTRACT

An electrically driven vehicle includes a floor panel, a tunnel section, an electrical storage device, and an electric power line. The tunnel section is formed in a vehicle forward/rearward direction in a central portion of the floor panel in a vehicle width direction. The electrical storage device is disposed behind the tunnel section of the vehicle above the floor panel. The electric power line is disposed below the tunnel section and connected to the electrical storage device. The tunnel section has an opening portion formed in a rear end portion of the tunnel section located in front of the electrical storage device of the vehicle and through which the electric power line is inserted.

8 Claims, 6 Drawing Sheets

(51) Int. Cl.
*B60R 13/08* (2006.01)
*B62D 25/20* (2006.01)

(58) Field of Classification Search
CPC ............... B60R 13/0869; B62D 25/20; B60Y 2410/114; B60Y 2410/115; Y02T 10/70
See application file for complete search history.

(56) References Cited

U.S. PATENT DOCUMENTS

| | | | |
|---|---|---|---|
| 2015/0195960 A1* | 7/2015 | Seki | H05K 9/0052 |
| | | | 361/690 |
| 2019/0232776 A1* | 8/2019 | Matsuda | B60K 6/40 |
| 2021/0221212 A1* | 7/2021 | Shimada | B60K 1/04 |
| 2021/0221239 A1* | 7/2021 | Kawase | B60L 50/66 |

FOREIGN PATENT DOCUMENTS

| | | | |
|---|---|---|---|
| JP | 2011-068187 | 4/2011 | |
| JP | 2013-006503 | 1/2013 | |
| JP | 2014-024359 | 2/2014 | |
| JP | 2015-209117 | 11/2015 | |
| JP | 2018-030513 | 3/2018 | |
| JP | 2018043584 A * | 3/2018 | ............... B60K 1/04 |
| JP | 2020-023277 | 2/2020 | |
| JP | 2021-011209 | 2/2021 | |
| KR | 10-1523481 | 5/2015 | |

\* cited by examiner

ELECTRICALLY DRIVEN VEHICLE

CROSS-REFERENCE TO RELATED APPLICATION

Priority is claimed on Japanese Patent Application No. 2021-058204, filed on Mar. 30, 2021, the contents of which are incorporated herein by reference.

BACKGROUND

Field of the Invention

The present invention relates to an electrically driven vehicle.

Background

Among electrically driven vehicles, for example, one in which a floor tunnel (a center tunnel) extends in a vehicle body forward/rearward direction at a center of a floor panel in a vehicle width direction, an intermediate portion of the floor tunnel is formed lower than a height of a tunnel area on the front and rear sides, and an electrical storage device is provided in the intermediate portion is known. The electrically driven vehicle has an opening portion formed in an upper surface portion of a front tunnel. Further, an electric power line in the front tunnel is guided to an upper surface portion of the front tunnel via the opening portion. The guided electric power line is guided from the upper surface portion of the front tunnel to the electrical storage device to be connected to the electrical storage device. In addition, a reinforcement member is attached above the electrical storage device and the electric power line, and the electrical storage device and the electric power line are covered with the reinforcement member from above (for example, see Japanese Unexamined Patent Application, First Publication No. 2018-30513).

SUMMARY

However, the electrically driven vehicle disclosed in Japanese Unexamined Patent Application, First Publication No. 2018-30513, is configured to have the opening portion formed in the upper surface portion of the front tunnel, and such that the electric power line guided from the opening portion of the upper surface portion is connected to the electrical storage device. For this reason, a space for routing the electric power line is required above the upper surface portion of the front tunnel. As a result, it may affect a passenger compartment space.

An aspect of the present invention is directed to providing an electrically driven vehicle capable of minimizing an influence on a passenger compartment space due to routing of an electric power line.

An electrically driven vehicle according to a first aspect of the present invention includes: a floor panel that constitutes a bottom surface of a vehicle body; a tunnel section formed in a vehicle forward/rearward direction in a central portion of the floor panel in a vehicle width direction; an electrical storage device disposed behind the tunnel section of the vehicle and above the floor panel; and an electric power line disposed below the tunnel section and connected to the electrical storage device, wherein the tunnel section has an opening portion formed in a rear end portion of the tunnel section located in front of the electrical storage device of the vehicle and through which the electric power line is inserted.

With this configuration, the electric power line disposed (routed) in the tunnel section can be connected to the electrical storage device via the opening portion of the rear end portion. Accordingly, there is no need to secure a space for routing the electric power line above the tunnel section, and an effect on a passenger compartment space due to routing of the electric power line can be minimized.

A second aspect is the electrically driven vehicle according to the first aspect which may include: a first cross member provided on the floor panel and extending in the vehicle width direction between the tunnel section and the electrical storage device; and a second cross member provided on the floor panel behind the electrical storage device of the vehicle and extending in the vehicle width direction, wherein a central portion of the first cross member may be formed lower than both end portions of the first cross member, and the electric power line may be disposed on both end portions of the first cross member to overlap a projection plane in the vehicle width direction.

In this way, the first cross member is disposed between the tunnel section and the electrical storage device, and the central portion of the first cross member is formed lower than both end portions. For this reason, the rear end portion of the tunnel section can be correspondingly disposed above the central portion of the first cross member.

In addition, the electric power line is disposed on a projection plane in the vehicle width direction to overlap both end portions of the first cross member in the upward/downward direction. For this reason, the electric power line routed from the opening portion of the rear end portion can be connected to the electrical storage device via the central portion of the first cross member. In this way, since the central portion of the first cross member is formed low, there is no need to connect the electric power line to the electrical storage device by bypassing the electric power line above the first cross member.

Accordingly, there is no need to secure the space for routing the electric power line (a routing space) above the tunnel section, and an effect on the passenger compartment space due to routing of the electric power line can be minimized.

A third aspect is the electrically driven vehicle according to the second aspect which may include a cover section fixed to the first cross member and the second cross member to cover the electrical storage device and having another opening portion through which the electric power line is able to be inserted.

With this configuration, the first cross member with the central portion formed low can be reinforced by the cover section. Accordingly, yield strength of the first cross member with respect to a load input from a side of the vehicle can be increased. Accordingly, the electric power line can be appropriately protected by minimizing deformation of the first cross member with respect to the load input from a side of the vehicle.

A fourth aspect is the electrically driven vehicle according to the third aspect which may include a reinforcement member configured to connect the tunnel section and the cover section above the electric power line.

With this configuration, for example, bending of the floor panel in the vehicle forward/rearward direction between the tunnel section and the cover section (a boundary) can be minimized by the reinforcement member. Accordingly, for example, curves of the electric power line in a lengthwise direction can be minimized, and the electric power line can be appropriately protected.

A fifth aspect is the electrically driven vehicle according to any one of the first to fourth aspects which may include: an exhaust pipe disposed below the tunnel section and below the electric power line; and a heat shielding plate disposed between the exhaust pipe and the electric power line, wherein the heat shielding plate may extend below the opening portion.

In this way, the exhaust pipe is disposed below the electric power line, and the heat shielding plate (heat baffle) is disposed between the exhaust pipe and the electric power line. Further, the heat shielding plate extends below the opening portion. For this reason, the electric power line can be protected by the heat shielding plate from below. Accordingly, for example, it is possible to suppress the ground water from splashing and being applied to the electric power line, and to appropriately protect the electric power line.

According to the aspect of the present invention, the rear end portion of the tunnel section is disposed in front of the electrical storage device of the vehicle, and the opening portion through which the electric power line is inserted is formed in the rear end portion of the tunnel section. Accordingly, an effect on the passenger compartment due to routing of the electric power line can be minimized.

DESCRIPTION OF EMBODIMENTS

Figure 1:
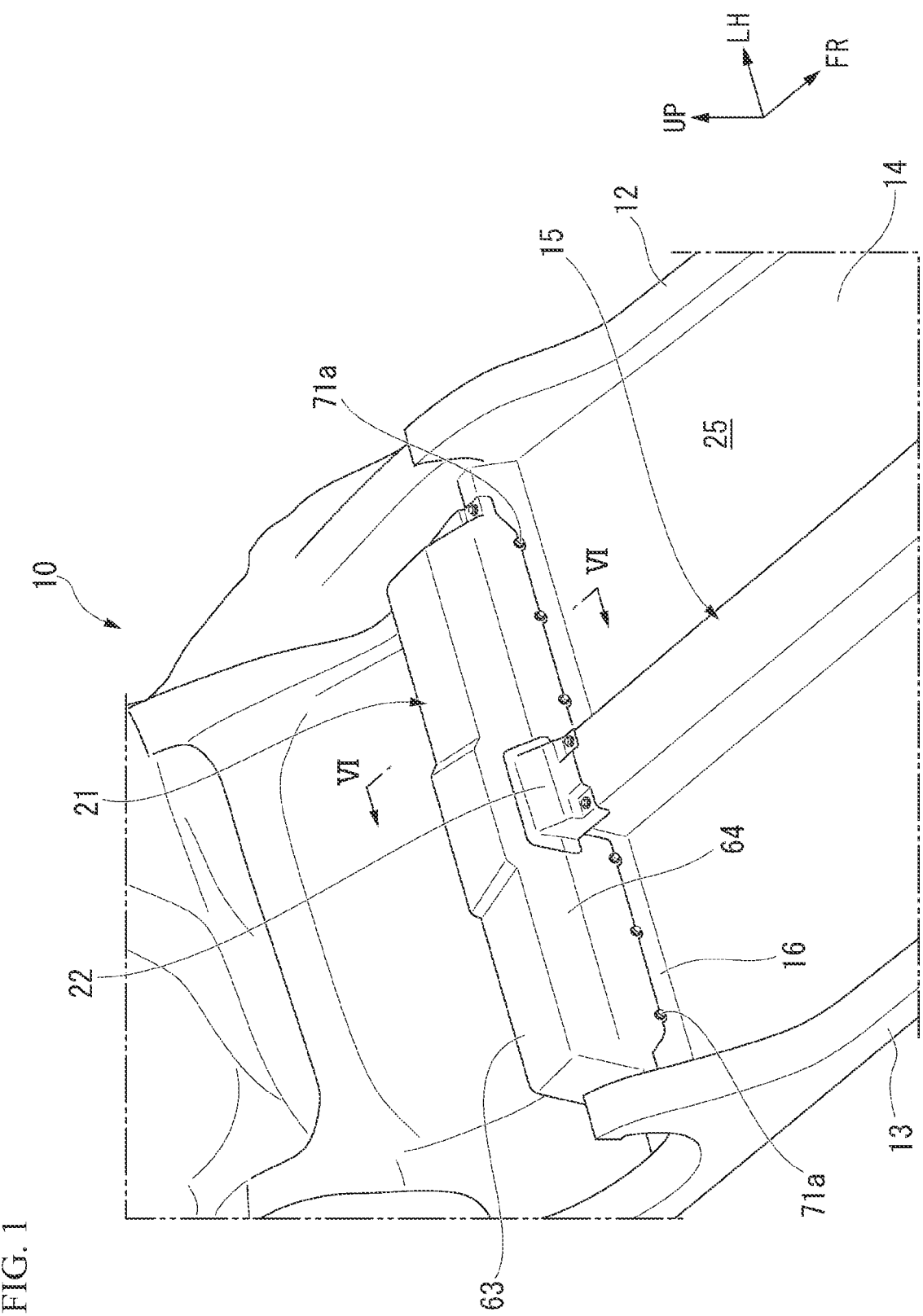
FIG. 1 is a perspective view of an electrically driven vehicle of an embodiment according to the present invention from a front right side.

Hereinafter, an electrically driven vehicle according to an embodiment of the present invention will be described with reference to the accompanying drawings. In the drawings, an arrow FR indicates a forward direction of a vehicle, an arrow UP indicates an upward direction of the vehicle, and an arrow LH indicates a leftward direction of the vehicle.

<Electrically Driven Vehicle>

Figure 2:
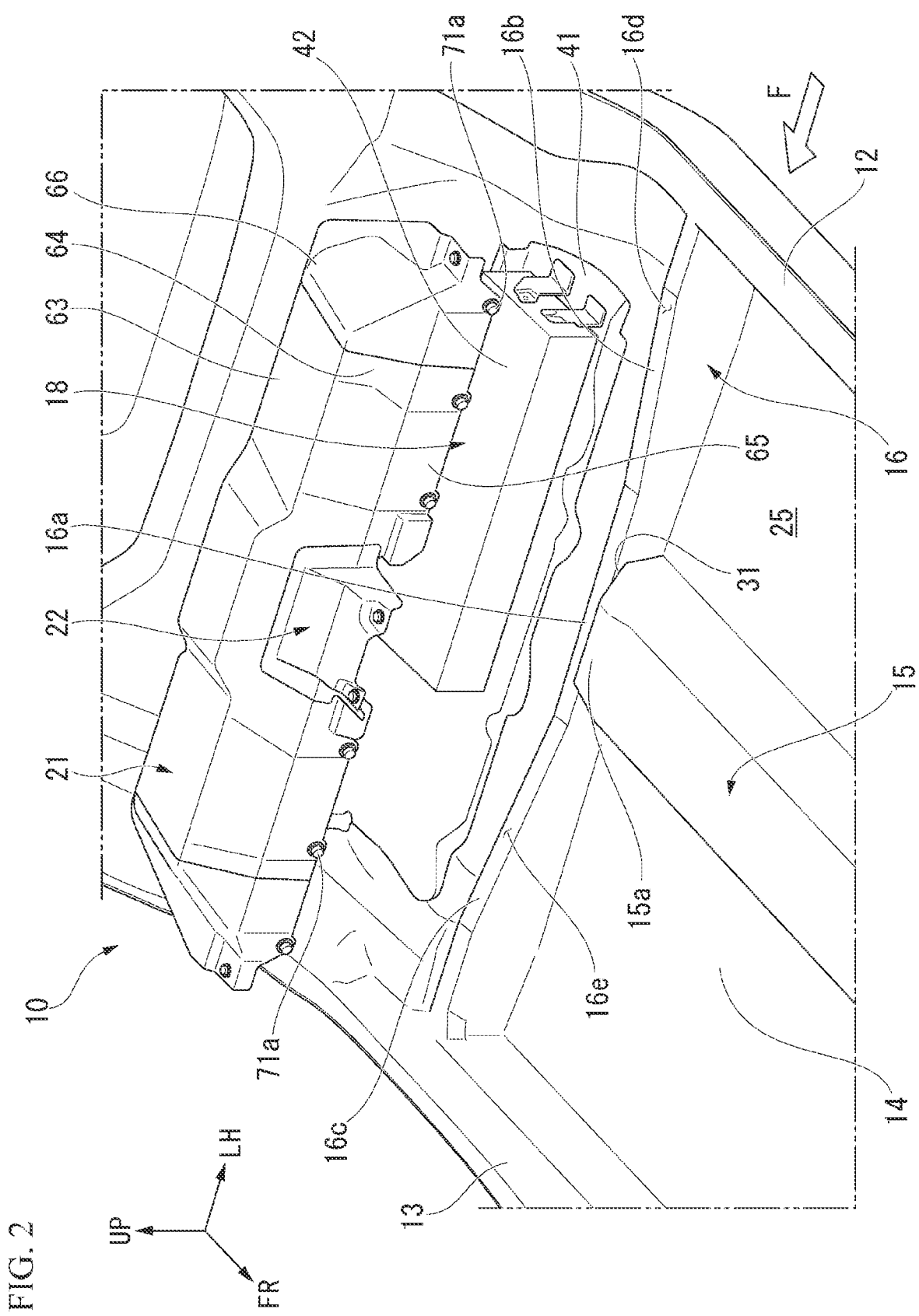
FIG. 2 is a perspective view from a front left side of an electrical storage device and a cover section, which are exploded from the electrically driven vehicle of the embodiment.
Figure 3:
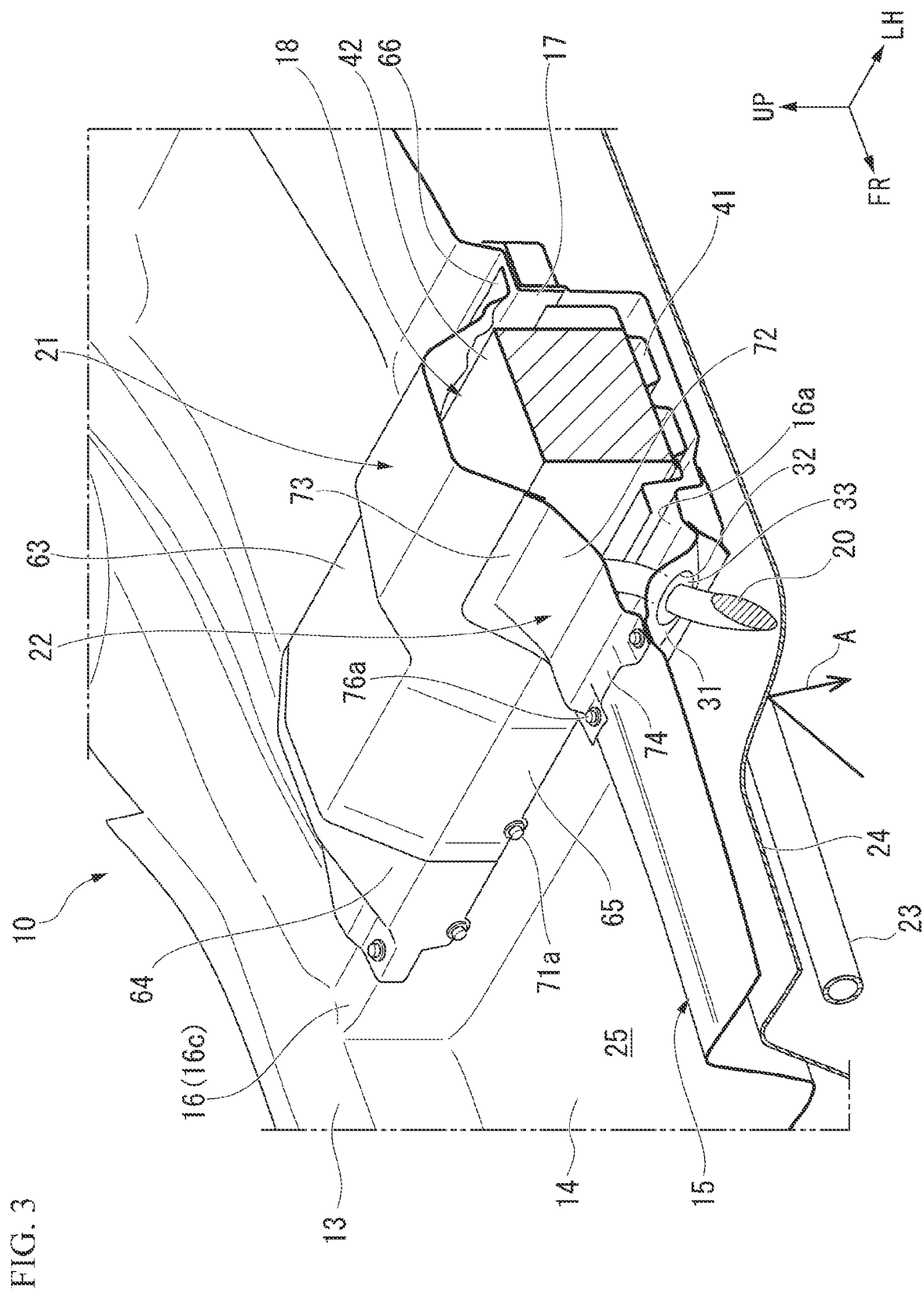
FIG. 3 is a perspective view from a front left side of a state in which the electrically driven vehicle of the embodiment is cut in a floor tunnel in a vehicle forward/rearward direction.

As shown in FIG. 1 to FIG. 3, for example, an electrically driven vehicle 10 is an electric automobile such as a hybrid vehicle or the like that travels using an electric motor (not shown) as a driving source.

The electrically driven vehicle 10 includes, for example, left and right side sills 12 and 13, a floor panel 14, a floor tunnel (a tunnel section, a center tunnel) 15, a first cross member 16, a second cross member 17, an electrical storage device 18, a DC cable (an electric power line) 20, a cover section 21, a reinforcement member 22, an exhaust pipe 23, and a heat shielding plate (a heat baffle) 24.

Further, the electrically driven vehicle 10 may be simply called "the vehicle 10" hereinafter.

<Side Sill>

The left side sill 12 is provided on, for example, a left outer side of a passenger compartment (cabin) 25 and extends in a vehicle forward/rearward direction. The left side sill 12 is, for example, a hollow member formed in a rectangular closed cross section with high rigidity.

The right side sill 13 is provided on, for example, a right outer side of the passenger compartment 25 and extends in the vehicle forward/rearward direction. The right side sill 13 is, for example, a hollow member formed in a rectangular closed cross section with high rigidity, like the left side sill 12.

The floor panel 14 is supported between the left side sill 12 and the right side sill 13.

The floor panel 14 forms a floor surface of the passenger compartment 25 by configuring a bottom surface of the vehicle body.

<Floor Tunnel>

The floor tunnel 15 is formed in the vehicle forward/rearward direction in a central portion of the floor panel 14 in the vehicle width direction. The floor tunnel 15 is raised upward from the floor panel 14 in a trapezoidal cross-sectional shape. The floor tunnel 15 extends, for example, toward a rear side of the vehicle from a lower dashboard (not shown) that partitions a front surface of the passenger compartment 25 to the first cross member 16.

Figure 4:
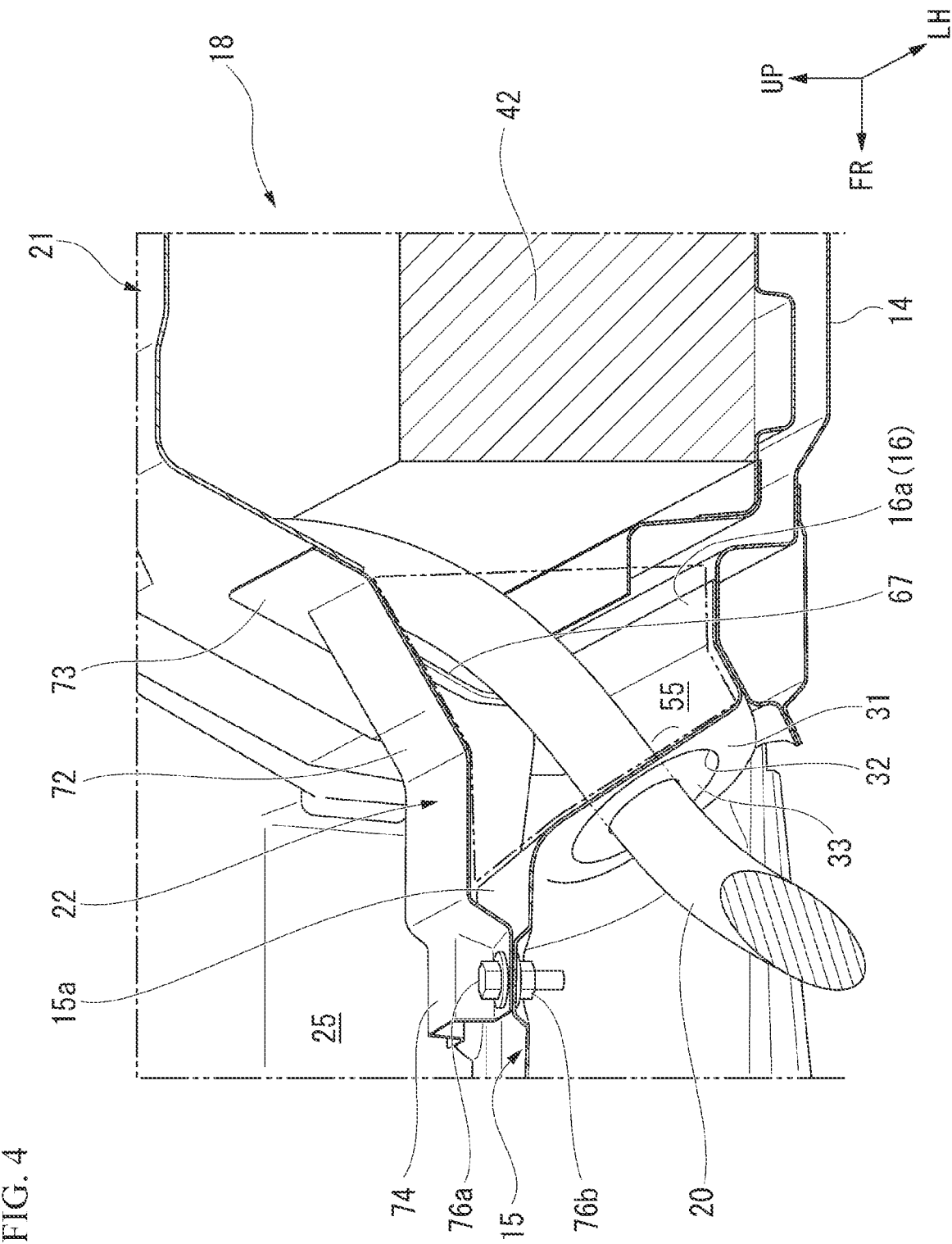
FIG. 4 is a perspective view showing a state in which a DC cable is connected to the electrical storage device included in the electrically driven vehicle of the embodiment.

As shown in FIG. 3 and FIG. 4, the floor tunnel 15 has a tunnel rear wall portion (a rear end portion) 31 located in front of the first cross member 16 and the electrical storage device 18 of the vehicle. The tunnel rear wall portion 31 is formed in a downward gradient toward the rear side of the vehicle from a rear end apex portion 15a of the floor tunnel 15 to a central member portion 16a (to be described below) of the first cross member 16. The tunnel rear wall portion 31 has a first opening portion (an opening portion) 32 formed approximately in the central portion. The first opening portion 32 is formed in, for example, a circular shape through which the DC cable 20 can be inserted. Further, the shape of the first opening portion 32 can be arbitrarily selected.

A grommet 33 is attached to the first opening portion 32, and the DC cable 20 is inserted through the grommet 33. That is, the DC cable 20 is inserted through the first opening portion 32 via the grommet 33.

<First Cross Member>

As shown in FIG. 2 and FIG. 3, the first cross member 16 is provided on the floor panel 14 between the floor tunnel 15 and the electrical storage device 18. The first cross member 16 is disposed between the floor tunnel 15 and the electrical storage device 18, and extends in the vehicle width direction to pass over the left side sill 12 and the right side sill 13. Further, the first cross member 16 is a hollow member protruding upward from the floor panel 14 and formed in a rectangular closed cross section with high rigidity together with the floor panel 14.

The first cross member 16 has a central member portion (a central portion) 16a, a left member portion (one of both end portions) 16b, and a right member portion (the other end portion) 16c.

The central member portion 16a is disposed at a center of the first cross member 16 in the vehicle width direction, and has a height that is lower than that of the left member portion 16b and the right member portion 16c. The left member portion 16b is provided between the left side sill 12 and the central member portion 16a, and has an outer end portion connected to the left side sill 12 and an inner end portion connected to the central member portion 16a.

The left member portion 16b has an outer end portion formed at substantially the same height as the left side sill 12 and an inner end portion formed at substantially the same height as the central member portion 16a. That is, the left member portion 16b has an upper surface portion 16d formed in an inclined shape to gradually descend from the outer end portion toward the inner end portion.

The right member portion 16c is formed substantially symmetrically with respect to the left member portion 16b. For this reason, detailed description of the right member portion 16c will be omitted. The right member portion 16c has an outer end portion formed at substantially the same height as the right side sill 13 and an inner end portion formed at substantially the same height as the central member portion 16a. That is, the right member portion 16c has an upper surface portion 16e formed in an inclined shape to gradually descend from the outer end portion toward the inner end portion.

<Second Cross Member>

The electrical storage device 18 is provided behind the first cross member 16 of the vehicle, and the second cross member 17 is provided behind the electrical storage device 18 of the vehicle. The second cross member 17 is located behind the electrical storage device 18 of the vehicle. The second cross member 17 extends in the vehicle width direction to pass over the left side sill 12 and the right side sill 13. Further, the second cross member 17 is a hollow member formed in a rectangular closed cross section with high rigidity together with the floor panel 14.

<Electrical Storage Device>

Figure 5:
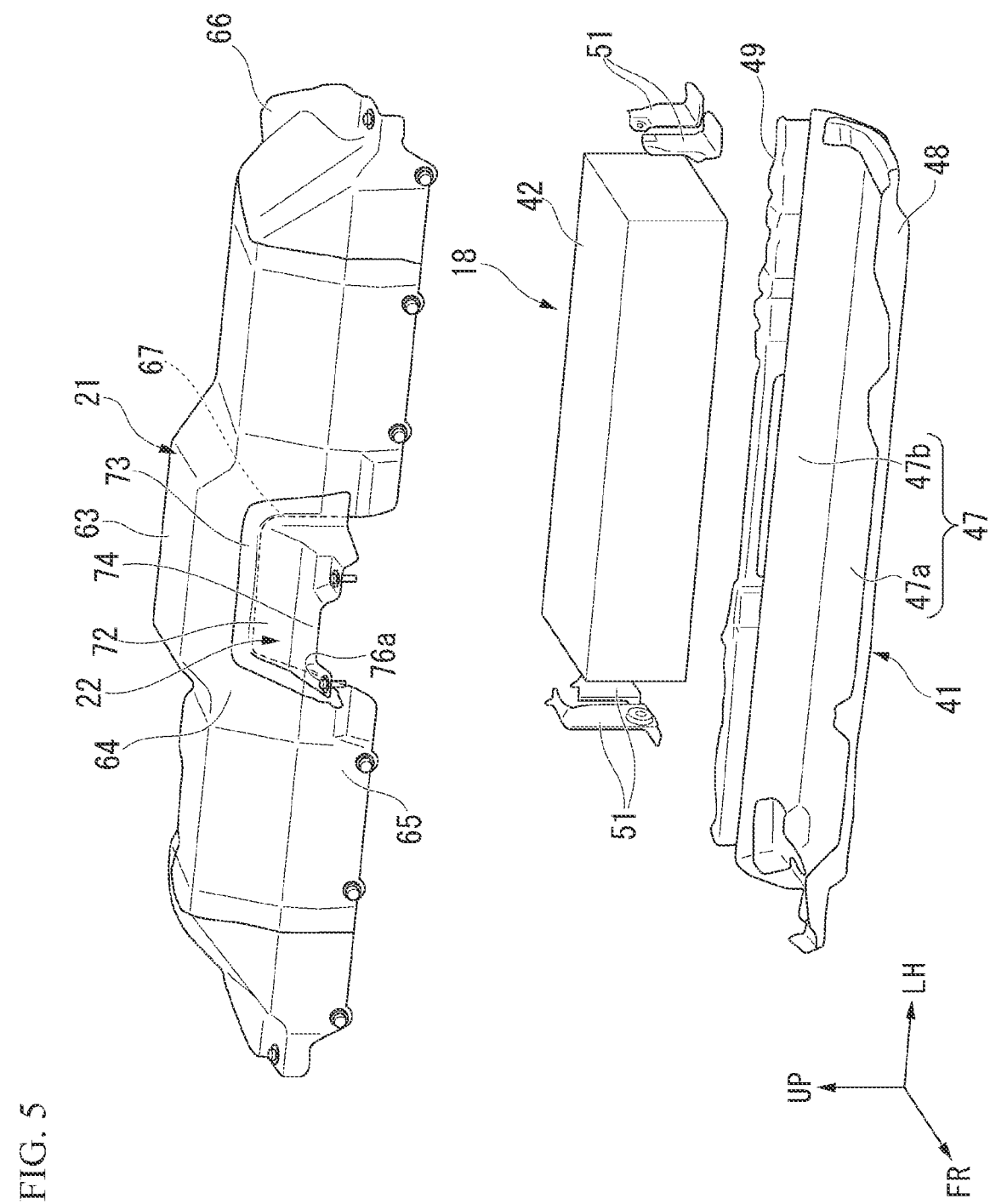
FIG. 5 is an exploded perspective view of the electrical storage device and the cover section included in the electrically driven vehicle of the embodiment.
Figure 6:
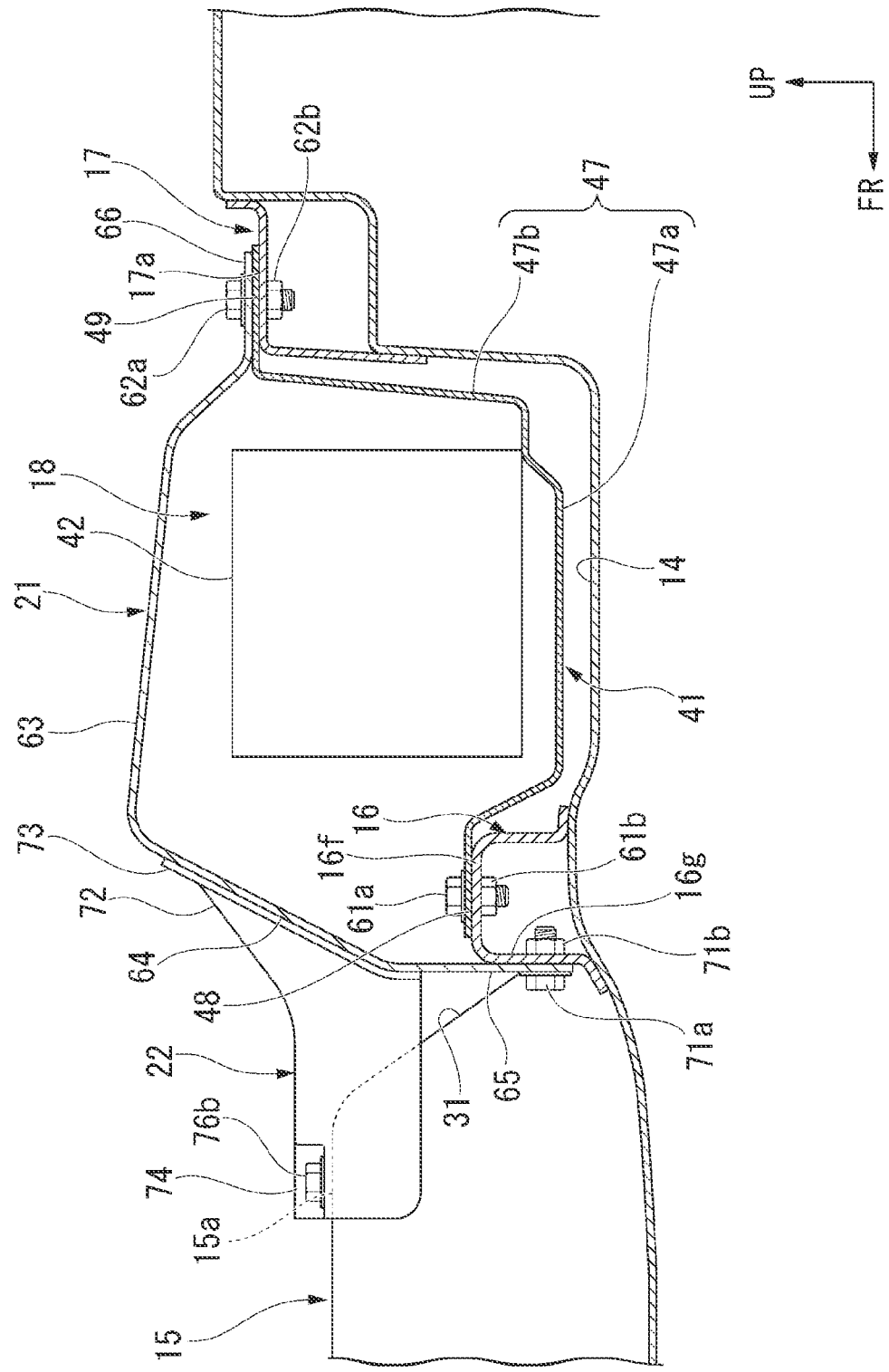
FIG. 6 is a cross-sectional view along line VI-VI in FIG. 1.

As shown in FIG. 5 and FIG. 6, the electrical storage device 18 is disposed behind the floor tunnel 15 of vehicle between the first cross member 16 and the second cross member 17 above the floor panel 14. The electrical storage device 18 includes a base plate 41 and a battery module 42.

The base plate 41 extends in the vehicle width direction between the first cross member 16 and the second cross member 17. The base plate 41 has a plate main body 47, a front flange 48 and a rear flange 49. The plate main body 47 is formed in a substantially L-shaped cross section by a plate bottom portion 47a and a plate wall portion 47b.

The front flange 48 overhangs forward from a front side of the plate bottom portion 47a of the vehicle. The front flange 48 is placed on an upper surface portion 16f of the first cross member 16 and fixed thereto by a plurality of bolts 61a and nuts 61b. The upper surface portion 16f of the first cross member 16 is formed by, for example, an upper surface portion of the central member portion 16a, the upper surface portion 16d of the left member portion 16b, and the upper surface portion 16e of the right member portion 16c.

The rear flange 49 overhangs rearward from an upper side of the plate wall portion 47b of the vehicle. The rear flange 49 is placed on and fixed to an upper surface portion 17a of the second cross member 17 by a plurality of bolts 62a and nuts 62b. For this reason, the first cross member 16 and the second cross member 17 are reinforced by the base plate 41.

The battery module 42 is fixed to the plate bottom portion 47a of the base plate 41 by a support bracket 51 or the like. The battery module 42 is formed by stacking, for example, a plurality of battery cells (not shown) in the vehicle width direction.

As shown in FIG. 4, a space 55 is formed between the battery module 42 and the tunnel rear wall portion 31 of the floor tunnel 15, above the central member portion 16a of the first cross member 16 and below the rear end apex portion 15a of the floor tunnel 15. That is, in the space 55, the central member portion 16a of the first cross member 16 is formed below the rear end apex portion 15a of the floor tunnel 15 by being formed lower than the left member portion 16b and the right member portion 16c. For this reason, the amount of the space 55 protruding toward the passenger compartment 25 can be minimized Hereinafter, the space 55 is also referred to as "the dead space 55."

<Dc Cable>

As shown in FIG. 3 and FIG. 4, the DC cable 20 is connected to the electrical storage device 18. The DC cable 20 is connected to, for example, a power control unit (PCU), which is not shown. Further, the DC cable 20 is disposed (routed) below (including inside) the floor tunnel 15, and extends to the tunnel rear wall portion 31. The DC cable 20 extending to the tunnel rear wall portion 31 is inserted through the first opening portion 32 via the grommet 33. The DC cable 20 inserted through the first opening portion 32 is connected to a high voltage junction board (not shown) via the dead space 55 and a second opening portion 67 (to be described below) above the central member portion 16a of the first cross member 16. The high voltage junction board is, for example, a device configured to supply electricity of the battery module 42 to an electric motor for driving (not shown).

That is, the DC cable 20 is disposed to overlap the left member portion 16b and the right member portion 16c (see FIG. 2) of the first cross member 16 in the upward/downward direction on a projection plane in the vehicle width direction. In other words, the DC cable 20 is disposed to overlap the central member portion 16a of the first cross member 16 when seen in a side view of the vehicle.

<Cover Section>

As shown in FIG. 4 to FIG. 6, the battery module 42 of the electrical storage device 18 is covered with the cover section 21 from above. The cover section 21 has a cover apex portion 63, a cover front wall portion 64, a cover front flange 65, a cover rear flange 66, and a second opening portion (another opening portion) 67.

The cover apex portion 63 is disposed to cover the battery module 42 from above. The cover front wall portion 64 extends in substantially a downward gradient from a front side of the cover apex portion 63 toward the front of the vehicle, and disposed to cover the front surface portion of the battery module 42 from a side in front of the vehicle.

The cover front flange 65 overhangs downward from a front lower side of the cover front wall portion 64. The cover front flange 65 is fixed to a front wall portion 16g of the first cross member 16 by a bolt 71a and a nut 71b. The cover rear flange 66 overhangs rearward from a rear side of the cover apex portion 63 of the vehicle. The cover rear flange 66 is fixed to the upper surface portion 17a of the second cross member 17 by a bolt 62a and a nut 62b together with the rear flange 49 while being placed on the rear flange 49 of the base plate 41.

For this reason, the cover section 21 is attached to cover the opening portion of the base plate 41 while being fixed to the first cross member 16 and the second cross member 17. In this state, the battery module 42 of the electrical storage device 18 is covered with the cover section 21 from above.

As shown in FIG. 2 and FIG. 3, the cover section 21 is fixed to the first cross member 16 and the second cross member 17. For this reason, the first cross member 16 with the central member portion 16a formed low is reinforced by the cover section 21. Accordingly, yield strength of the first cross member 16 with respect to a load F input from a side of the vehicle 10 can be increased.

Further, the base plate 41 is fixed to the first cross member 16 and the second cross member 17. For this reason, the first cross member 16 with the central member portion 16a formed low is more appropriately reinforced by the cover section 21 and the base plate 41. Accordingly, yield strength of the first cross member 16 with respect to the load F input from a side of the vehicle 10 can be further increased.

Accordingly, the DC cable 20 can be appropriately protected by minimizing deformation of the first cross member 16 with respect to the load F input from a side of the vehicle 10.

As shown in FIG. 4 and FIG. 5, the second opening portion 67 is formed at a center of the cover front wall portion 64 in the vehicle width direction. For example, the second opening portion 67 is formed in a door shape (an inverse U shape) with a lower end portion open and through which the DC cable 20 can be inserted. The second opening portion 67 is disposed behind the first opening portion 32 formed in the tunnel rear wall portion 31 of the floor tunnel 15 of the vehicle. As described above, the DC cable 20 guided from the dead space 55 is inserted through the second opening portion 67. The DC cable 20 inserted through the second opening portion 67 is connected to the electrical storage device 18.

<Reinforcement Member>

The second opening portion 67 is covered with the reinforcement member 22 from above. The reinforcement member 22 has, for example, a reinforcement main body 72, a reinforcement rear flange 73, and a reinforcement front flange 74.

The reinforcement main body 72 has, for example, a rear end portion formed in a door shape (inversed U shape) to cover the second opening portion 67, and a front end portion formed to cover the rear end apex portion 15a of the floor tunnel 15 from above. The reinforcement rear flange 73 is formed on a rear end portion of the reinforcement main body 72.

The reinforcement rear flange 73 is fixed to, for example, the cover front wall portion 64 along the second opening portion 67. The reinforcement front flange 74 is formed on a front end portion of the reinforcement main body 72. The reinforcement front flange 74 is fixed to, for example, the rear end apex portion 15a of the floor tunnel 15 by a bolt 76a and a nut 76b.

The reinforcement member 22 is disposed to cover the dead space 55 from above by being fixed to the cover front wall portion 64 and the rear end apex portion 15a of the floor tunnel 15. The DC cable 20 is disposed in the dead space 55. That is, the reinforcement member 22 is disposed to cover the DC cable 20 from above by being fixed to the cover front wall portion 64 and the rear end apex portion 15a of the floor tunnel 15.

In addition, since the reinforcement member 22 is fixed to the cover front wall portion 64 and the rear end apex portion 15a of the floor tunnel 15, bending of the floor panel 14 in the vehicle forward/rearward direction between the cover front wall portion 64 and the rear end apex portion 15a (a boundary) can be minimized by the reinforcement member 22. Accordingly, for example, curves of the DC cable 20 in the lengthwise direction can be minimized, and the DC cable 20 can be appropriately protected.

<Exhaust Pipe, Heat Shielding Plate>

As shown in FIG. 3 and FIG. 4, the exhaust pipe 23 is disposed below the floor tunnel 15. The exhaust pipe 23 is disposed below the floor tunnel 15 and below the DC cable 20. The heat shielding plate 24 is disposed between the exhaust pipe 23 and the DC cable 20.

Here, the DC cable 20 is disposed along an upper side of the exhaust pipe 23 to the first opening portion 32 of the tunnel rear wall portion 31. Further, the heat shielding plate 24 extends below the first opening portion 32. For this reason, the DC cable 20 can be protected by the heat shielding plate 24 from below.

That is, for example, even when ground water is splashed, the splashed water can be received by the heat shielding plate 24 as shown by an arrow A. Accordingly, the DC cable 20 can be appropriately protected by suppressing the water splashed from the ground from being applied to the DC cable 20 from the ground.

As described above, in the electrically driven vehicle 10 of the embodiment, as shown in FIG. 3 and FIG. 4, the tunnel rear wall portion 31 of the floor tunnel 15 is disposed in front of the electrical storage device 18 of the vehicle, and the first opening portion 32 through which the DC cable 20 is inserted is formed in the tunnel rear wall portion 31. For this reason, the DC cable 20 disposed below (including inside) the floor tunnel 15 is connected to the electrical storage device 18 via the first opening portion 32, the dead space 55, and the like.

Accordingly, it is not necessary to secure a routing space (i.e., a handling space, a routing space) required to handle the DC cable 20 above the floor tunnel 15. Accordingly, an effect on the space of the passenger compartment 25 due to routing of the DC cable 20 can be minimized.

As shown in FIG. 2 and FIG. 4, the first cross member 16 is disposed between the floor tunnel 15 and the electrical storage device 18, and the central member portion 16a of the first cross member 16 is formed lower than the left member portion 16b and the right member portion 16c. For this reason, the tunnel rear wall portion 31 can be correspondingly disposed above the central member portion 16a (i.e., the dead space 55).

Further, on a projection plane in the vehicle width direction, the DC cable 20 is disposed to overlap the left member portion 16b and the right member portion 16c of the first cross member 16 in the upward/downward direction. That is, the DC cable 20 is disposed above the central member portion 16a of the first cross member 16. For this reason, the DC cable 20 routed from the first opening portion 32 of the tunnel rear wall portion 31 can be connected to the electrical storage device 18 via the dead space 55 above the central member portion 16a.

In this way, since the central member portion 16a is formed lower than the left member portion 16b and the right member portion 16c, there is no need to connect the DC cable 20 to the electrical storage device 18 by routing the DC cable 20 to bypass above the first cross member 16.

Accordingly, as described above, there is no need to secure the routing space of the DC cable 20 above the tunnel section, and an effect on the space of the passenger compartment 25 due to routing of the DC cable 20 can be minimized.

Further, the technical scope of the present invention is not limited to the embodiment, and various modifications may be made without departing from the scope of the present invention.

In addition, the components in the embodiment can be appropriately substituted with known components without departing from the scope of the present invention. Further, the above-mentioned variants may be appropriately combined.

What is claimed is:

1. An electrically driven vehicle, comprising:
a floor panel that constitutes a bottom surface of a vehicle body;
a tunnel section formed in a vehicle forward/rearward direction in a central portion of the floor panel in a vehicle width direction;
an electrical storage device disposed behind the tunnel section of the vehicle and above the floor panel;
an electric power line disposed below the tunnel section and connected to the electrical storage device;
a first cross member provided on the floor panel and extending in the vehicle width direction between the tunnel section and the electrical storage device; and
a second cross member provided on the floor panel behind the electrical storage device of the vehicle and extending in the vehicle width direction,
wherein the tunnel section has an opening portion formed in a rear end portion of the tunnel section located in front of the electrical storage device of the vehicle and through which the electric power line is inserted,
a central portion of the first cross member is formed lower than both end portions of the first cross member, and
the electric power line is disposed on both end portions of the first cross member to overlap a projection plane in the vehicle width direction.

2. The electrically driven vehicle according to claim 1, comprising:
an exhaust pipe disposed below the tunnel section and below the electric power line; and
a heat shielding plate disposed between the exhaust pipe and the electric power line,
wherein the heat shielding plate extends below the opening portion.

3. The electrically driven vehicle according to claim 1, comprising:
a cover section fixed to the first cross member and the second cross member to cover the electrical storage device and having another opening portion through which the electric power line is able to be inserted.

4. The electrically driven vehicle according to claim 3, comprising:
a reinforcement member configured to connect the tunnel section and the cover section above the electric power line.

5. The electrically driven vehicle according to claim 4, comprising:
an exhaust pipe disposed below the tunnel section and below the electric power line; and
a heat shielding plate disposed between the exhaust pipe and the electric power line,
wherein the heat shielding plate extends below the opening portion.

6. The electrically driven vehicle according to claim 3, comprising:
an exhaust pipe disposed below the tunnel section and below the electric power line; and
a heat shielding plate disposed between the exhaust pipe and the electric power line,
wherein the heat shielding plate extends below the opening portion.

7. An electrically driven vehicle, comprising:
a floor panel that constitutes a bottom surface of a vehicle body;
a tunnel section formed in a vehicle forward/rearward direction in a central portion of the floor panel in a vehicle width direction;
an electrical storage device disposed behind the tunnel section of the vehicle and above the floor panel;
an electric power line disposed below the tunnel section and connected to the electrical storage device;
an exhaust pipe disposed below the tunnel section and below the electric power line; and
a heat shielding plate disposed between the exhaust pipe and the electric power line,
wherein the tunnel section has an opening portion formed in a rear end portion of the tunnel section located in front of the electrical storage device of the vehicle and through which the electric power line is inserted, and
the heat shielding plate extends below the opening portion.

8. An electrically driven vehicle, comprising:
a floor panel that constitutes a bottom surface of a vehicle body;
a tunnel section formed in a vehicle forward/rearward direction in a central portion of the floor panel in a vehicle width direction;
an electrical storage device disposed behind the tunnel section of the vehicle and above the floor panel;
an electric power line disposed below the tunnel section and connected to the electrical storage device;
a first cross member provided on the floor panel and extending in the vehicle width direction between the tunnel section and the electrical storage device; and
a second cross member provided on the floor panel behind the electrical storage device of the vehicle and extending in the vehicle width direction,
wherein the tunnel section has an opening portion formed in a rear end portion of the tunnel section located in front of the electrical storage device of the vehicle and through which the electric power line is inserted, and
a central portion of the first cross member is formed lower than both end portions of the first cross member.

* * * * *